United States Patent
Lee et al.

(10) Patent No.: US 7,839,944 B2
(45) Date of Patent: Nov. 23, 2010

(54) METHOD OF PERFORMING PHASE SHIFT-BASED PRECODING AND AN APPARATUS FOR SUPPORTING THE SAME IN A WIRELESS COMMUNICATION SYSTEM

(75) Inventors: Moon Il Lee, Gyeonggi-do (KR); Bin Chul Ihm, Gyeonggi-do (KR); Jin-Young Chun, Seoul (KR); Hyun Soo Ko, Seoul (KR); Wook Bong Lee, Gyeonggi-do (KR); Jin Hyuk Jung, Gyeonggi-do (KR)

(73) Assignee: LG Electronics, Inc., Seoul (KR)

( * ) Notice: Subject to any disclaimer, the term of this patent is extended or adjusted under 35 U.S.C. 154(b) by 567 days.

(21) Appl. No.: 11/858,049

(22) Filed: Sep. 19, 2007

(65) Prior Publication Data
US 2008/0089442 A1    Apr. 17, 2008

Related U.S. Application Data

(60) Provisional application No. 60/826,143, filed on Sep. 19, 2006, provisional application No. 60/887,298, filed on Jan. 30, 2007, provisional application No. 60/889,891, filed on Feb. 14, 2007, provisional application No. 60/894,665, filed on Mar. 13, 2007, provisional application No. 60/896,426, filed on Mar. 22, 2007.

(30) Foreign Application Priority Data

Apr. 26, 2007    (KR) .................. 10-2007-0040744

(51) Int. Cl.
*H04B 7/02* (2006.01)
(52) U.S. Cl. ...................................... 375/267
(58) Field of Classification Search ......... 375/259–260, 375/265–267, 285, 295, 299, 358; 370/210
See application file for complete search history.

(56) References Cited

U.S. PATENT DOCUMENTS 6,298,092 B1    10/2001    Heath, Jr. et al.
6,760,882 B1    7/2004    Gesbert et al.

(Continued)

FOREIGN PATENT DOCUMENTS

EP    1538772    6/2005

(Continued)

OTHER PUBLICATIONS

Wang et al., "Method and Apparatus for Pre-coding", U.S. Appl. No. 60/731,301, filed on Oct. 28, 2005.*

(Continued)

*Primary Examiner*—Khanh C Tran
(74) *Attorney, Agent, or Firm*—Lee, Hong, Degerman, Kang & Waimey (57) ABSTRACT

A method of transmitting data using a phase shift-based precoding in a multiple antenna system using a plurality of subcarriers is disclosed. More specifically, the method includes determining a diagonal matrix to provide different phase angles to each of the plurality of antennas as a part of a phase shift-based precoding matrix, selecting a unitary matrix from a first codebook as the part of a phase shift-based precoding matrix, and performing precoding to symbols associated with subcarriers based on the diagonal matrix and the unitary matrix.

8 Claims, 6 Drawing Sheets

U.S. PATENT DOCUMENTS

| | | | |
|---|---|---|---|
| 7,583,982 B2 | 9/2009 | Olesen et al. | |
| 7,609,613 B2 | 10/2009 | Aghvami et al. | |
| 7,620,019 B1 | 11/2009 | Smith et al. | |
| 7,636,297 B1 | 12/2009 | Lee et al. | |
| 7,702,029 B2 * | 4/2010 | Kotecha et al. | 375/267 |
| 2003/0048753 A1 | 3/2003 | Jalali | |
| 2003/0235255 A1 | 12/2003 | Ketchum et al. | |
| 2004/0192216 A1 | 9/2004 | Oprea | |
| 2005/0201307 A1 | 9/2005 | Chae et al. | |
| 2005/0281350 A1 | 12/2005 | Chae et al. | |
| 2006/0013186 A1 | 1/2006 | Agrawal et al. | |
| 2006/0013328 A1 | 1/2006 | Zhang et al. | |
| 2006/0039489 A1 | 2/2006 | Ikram et al. | |
| 2006/0039500 A1 | 2/2006 | Yun et al. | |
| 2006/0067277 A1 | 3/2006 | Thomas et al. | |
| 2006/0067443 A1 | 3/2006 | Liu et al. | |
| 2006/0093062 A1 | 5/2006 | Yun et al. | |
| 2006/0098568 A1 | 5/2006 | Oh et al. | |
| 2006/0098760 A1 | 5/2006 | Shen et al. | |
| 2006/0146692 A1 | 7/2006 | Gorokhov et al. | |
| 2006/0270360 A1 | 11/2006 | Han et al. | |
| 2007/0041457 A1 * | 2/2007 | Kadous et al. | 375/260 |
| 2007/0097856 A1 * | 5/2007 | Wang et al. | 370/210 |
| 2007/0133707 A1 | 6/2007 | Hwang et al. | |
| 2007/0147543 A1 | 6/2007 | Horng et al. | |
| 2007/0165738 A1 | 7/2007 | Barriac et al. | |
| 2007/0189416 A1 | 8/2007 | Kim et al. | |
| 2007/0263746 A1 | 11/2007 | Son | |
| 2007/0280373 A1 * | 12/2007 | Lee et al. | 375/267 |
| 2007/0291638 A1 | 12/2007 | Chae et al. | |
| 2007/0297529 A1 | 12/2007 | Zhou et al. | |
| 2008/0063115 A1 | 3/2008 | Varadarajan et al. | |
| 2008/0069031 A1 | 3/2008 | Zhang et al. | |
| 2008/0080637 A1 | 4/2008 | Khan et al. | |
| 2008/0108310 A1 | 5/2008 | Tong et al. | |
| 2008/0198946 A1 * | 8/2008 | Lee et al. | 375/299 |
| 2008/0205533 A1 * | 8/2008 | Lee et al. | 375/260 |
| 2008/0240274 A1 | 10/2008 | Han et al. | |
| 2009/0003466 A1 | 1/2009 | Taherzadehboroujeni et al. | |
| 2009/0003485 A1 | 1/2009 | Li et al. | |
| 2009/0110114 A1 | 4/2009 | Onggosanusi et al. | |
| 2009/0296844 A1 | 12/2009 | Ihm et al. | |
| 2009/0316807 A1 | 12/2009 | Kim et al. | |
| 2010/0027696 A1 | 2/2010 | Lee et al. | |
| 2010/0074309 A1 * | 3/2010 | Lee et al. | 375/219 |

FOREIGN PATENT DOCUMENTS

| | | |
|---|---|---|
| EP | 1655874 | 5/2006 |
| KR | 10-2006-0028989 | 4/2006 |
| KR | 10-2006-0038812 | 5/2006 |
| KR | 10-2006-0064501 | 6/2006 |
| KR | 10-2006-0130062 | 12/2006 |
| KR | 10-0715582 | 4/2007 |
| KR | 1020070068300 | 6/2007 |
| KR | 10-2008-0036499 | 4/2008 |
| KR | 10-0918747 | 9/2009 |
| RU | 2005-101422 A | 8/2005 |
| RU | 2351071 C2 | 1/2006 |
| WO | 2004-038952 A2 | 5/2004 |
| WO | 2004073224 | 8/2004 |
| WO | 2005-122516 | 12/2005 |
| WO | 2006002550 | 1/2006 |
| WO | 2006049417 | 5/2006 |
| WO | 2007094832 | 8/2007 |

OTHER PUBLICATIONS

Berder O., et al., "Optimal Minimum Distance-Based Precoder For MIMO Spatial Multiplexing Systems", IEEE Transactions on Signal Processing, Mar. 1, 2004, vol. 52, No. 03, pp. 617-627, XP011107796.

Chang S., et al., "Asymptotically Minimum BER Linear Block Precoders For MMSE Equalisation", IEEE Proceedings: Communications, Jun. 29, 2004, vol. 151, Nr. 4, pp. 297-304, XP006022313.

Athaudage, C.R.N., et al.; "An Efficient Framework to Exploit Frequency Diversity in OFDM: Precoding With Adaptive Subcarrier Selection"; The 17th Annual IEEE Int'l Symposium on Personal, Indoor, Mobile Radio Communications; Sep. 11, 2006.

Wang, J., et al.; "Method and Apparatus for Pre-Coding"; U.S. Appl. No. 60/731,301, filed Oct. 28, 2005.

NTT Docomo, 'Multi-Degree Cyclic Delay Diversity with Frequency-Domain Channel Dependent Scheduling', R1-062107, 3GPP TSG RAN WG1 Meeting #46, Aug. 28, 2006.

Samsung, "Further details on adaptive cyclic delay diversity scheme", R1-051046, 3GPP TSG RAN WG1 Meeting #42bis, Oct. 10, 2005.

Samsung, 'System performance of adaptive cyclic delay diversity scheme', R1-051047, 3GPP TSG RAN WG1 Meeting #42bis, Oct. 10, 2005.

NTT Docomo, 'Multi-Degree Cyclic Delay Diversity with Frequency-domain Channel Dependent Scheduling', R1-060991, 3GPP TSG RAN WG1 Meeting #44bis, Mar. 26, 2006.

NTT Docomo, 'Channel Dependent Scheduling with Cyclic Delay Diversity', R1-061192, 3GPP TSG RAN WG1 Meeting #45, May 8, 2006.

Ericsson, 'Phase Shift based Precoding for Downlink MIMO Transmission', R1-071032, 3GPP TSG RAN WG1 #48, Feb. 12, 2007.

NTT Docomo, 'CDD-Based Pre-coding Scheme for Rank = 1 and 2', R1-062732, 3GPP TSG RAN WG1 Meeting #46bis, Oct. 9, 2006.

LG Electronics, 'Generalized CDD scheme for E-Utra downlink MIMO', R1-062314, 3GPP TSG RAN WG1 Meeting #46, Aug. 28, 2006.

LG Electronics, et al., 'CDD-based Precoding for E-UTRA downlink MIMO', R1-063345, 3GPP TSG RAN WG1 Meeting #47, Nov. 6, 2006.

LG Electronics, et al., 'CDD-based Precoding for Open-loop E-UTRA downlink MIMO', R1-063346, 3GPP TSG RAN WG1 Meeting #47, Nov. 6, 2006.

Etri, 'Combined spatial Multiplexing and CSD transmission for rate 2 with 4 transmit antennas', R1-060828, 3GPP TSG RAN WG1 Meeting #44bis, Mar. 27, 2006.

Bauch et al., "Orthogonal Frequency Division Multiple Access with Cycile Delay Diversity", IEEE ITG Workshop on Smart Antennas, pp. 17-24, Mar. 2004.

* cited by examiner

METHOD OF PERFORMING PHASE SHIFT-BASED PRECODING AND AN APPARATUS FOR SUPPORTING THE SAME IN A WIRELESS COMMUNICATION SYSTEM

This application claims the benefit of Korean Application No. P2007-0040744, filed on Apr. 26, 2007, which is hereby incorporated by reference.

This application claims the benefit of U.S. Provisional Application No. 60/826,143, filed on Sep. 19, 2006, U.S. Provisional Application No. 60/887,298, filed on Jan. 30, 2007, U.S. Provisional Application No. 60/889,891, filed on Feb. 14, 2007, U.S. Provisional Application No. 60/894,665, filed on Mar. 13, 2007, and U.S. Provisional Application No. 60/896,426, filed on Mar. 22, 2007, which are hereby incorporated by reference.

BACKGROUND OF THE INVENTION

1. Field of the Invention

The present invention relates to a method of performing phase shift-based precoding, and more particularly, to a method of performing phase shift-based precoding and an apparatus for supporting the same in a wireless communication system.

2. Discussion of the Related Art

With the growing use and popularity of various multimedia services and wide use of communication services, the demand for wireless services is increasing rapidly. In order to accommodate changing demands, it is important to increase the capacity of the communication system. One way to increase capacity includes finding new available frequency bandwidth and improving the efficiency of the existing resources.

As an example of improving the use of the existing resources, a transmitter and a receiver can be equipped with multiple antennas for efficient use of the resources in the spatial domain so as to achieve diversity gain. Moreover, the multiple antennas allows parallel transmission of the data via each antenna so as to provide increase in the transmit capacity.

A method related to transmitting and receiving data using multiple antennas can be represented by a multi input, multi output (MIMO) system using an orthogonal frequency division multiplexing (OFDM).

SUMMARY OF THE INVENTION

Accordingly, the present invention is directed to a method of performing phase shift-based precoding and an apparatus for supporting the same in a wireless communication system that substantially obviates one or more problems due to limitations and disadvantages of the related art.

An object of the present invention is to provide a method of transmitting data using a phase shift-based precoding in a multiple antenna system using a plurality of subcarriers.

Another object of the present invention is to provide an apparatus for transmitting data using a phase shift-based precoding in a multiple antenna system using a plurality of subcarriers.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting data using a phase shift-based precoding in a multiple antenna system using a plurality of subcarriers includes determining a diagonal matrix to provide different phase angles to each of the plurality of antennas as a part of a phase shift-based precoding matrix, selecting a unitary matrix from a first codebook as the part of a phase shift-based precoding matrix, and performing precoding to symbols associated with subcarriers based on the diagonal matrix and the unitary matrix.

In another aspect of the present invention, an apparatus for transmitting data using a phase shift-based precoding in a multiple antenna system using a plurality of subcarriers includes a precoding matrix determining module configured to determine a diagonal matrix for at least one of phase shift and codebook, and the phase shift-based precoding matrix based on the diagonal matrix and an unitary matrix, and a precoding module configured to perform precoding on symbols of corresponding subcarriers based on the diagonal matrix and the unitary matrix.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
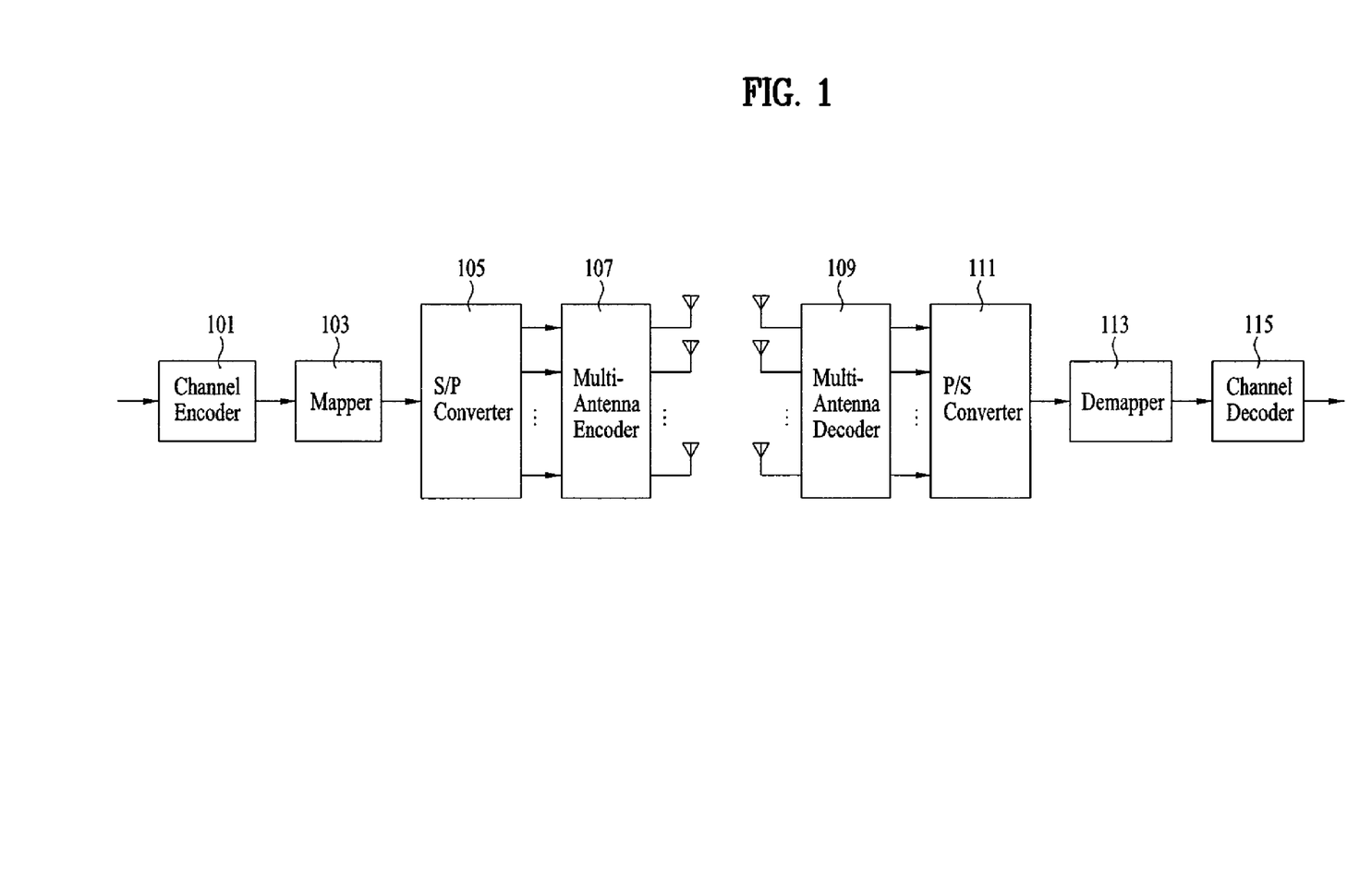
FIG. 1 is an exemplary diagram illustrating a structure of a transmitter and a receiver of a MIMO system.

FIG. 1 is an exemplary diagram illustrating a structure of a transmitter and a receiver in a MIMO system. Referring to FIG. 1, the transmitter comprises a channel encoder 101, a mapper 103, a serial-to-parallel (S/P) converter 105, and a multiple antenna encoder 107. More specifically, the channel encoder 101 can attach repeat (or extra) bits to the transmit data bits in order to reduce the interference caused by channel and/or noise. The mapper 103 can convert the data bits to data symbols, and the S/P converter 105 can align the data symbols for allocation to the subcarriers. Lastly, the multiple antenna encoder 107 can convert the data symbols arranged in parallel to space-time signals.

Further, the receiver comprises a multiple antenna decoder 109, a parallel-to-serial (P/S) converter 111, a demapper 113, and a channel decoder 115. The functions of the multiple antenna decoder 109, the P/S converter 111, the demapper 113, and the channel decoder 115 of the receiver are opposite to the functions of the multiple antenna encoder 107, the S/P converter 105, the mapper 103, and the channel encoder of the transmitter, respectively, and hence, detailed description will be omitted.

In a multiple antenna OFDM system, a various schemes can be used to increase the reliability of data transmission. These schemes include a space-time code (STC) scheme and a cyclic delay diversity (CDD) scheme. The STC and CDD schemes can be used to achieve space diversity. Furthermore, the schemes further include a beamforming scheme and a precoding scheme, which can be used to increase a signal-to-noise ratio (SNR).

The STC scheme and the CDD scheme is generally used in an open-loop system without feedback information to increase the reliability of the transmit data. Moreover, the beamforming scheme and the precoding scheme are generally used in a closed-loop system using feedback information to optimize the SNR.

In particular, as a scheme for increasing the spatial diversity gain and the SNR, the CDD scheme and the precoding scheme, respectively, can be discussed in more detail, as provided hereafter.

First, the CDD scheme allows for each antenna of the multiple antenna system to transmit OFDM signals having different delay or having different sizes so that the receiver can achieve frequency diversity gain.

Figure 2:
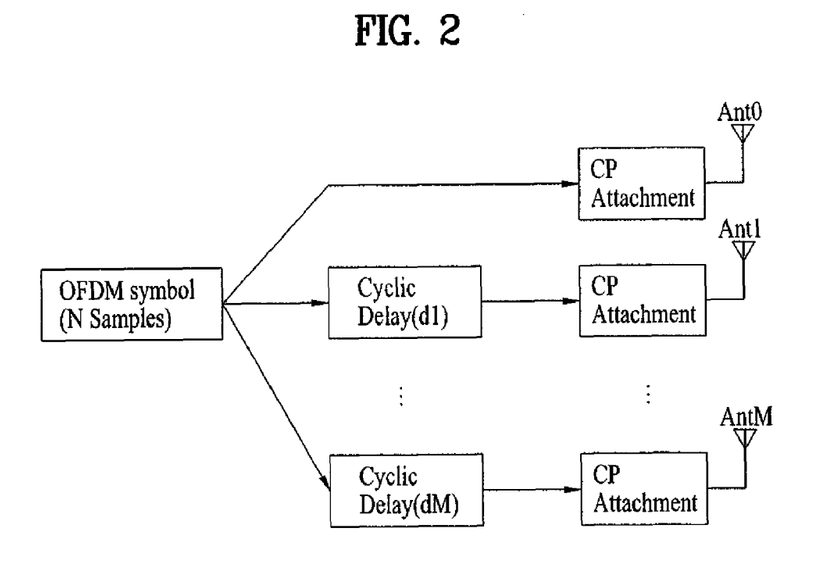
FIG. 2 is an exemplary diagram illustrating a transmitter of the multiple antenna system using the CDD scheme.

FIG. 2 is an exemplary diagram illustrating a transmitter of the multiple antenna system using the CDD scheme.

After the OFDM symbols are processed by the S/P converter and the multiple antenna encoder and subsequently transmitted via each antenna, a cyclic prefix (CP) can be added (or attached) to the OFDM symbols when being transmitted to the receiver. The CP can be added to the OFDM symbols to prevent inter-channel interference. Here, the data sequence sent to a first antenna for transmission is without the CP, but the data sequence sent to subsequent antennas for transmission has CP attached thereto. That is, the data sequences sent to the subsequent antennas have a specified amount of bits of cycle delay applied to them.

Figure 3:
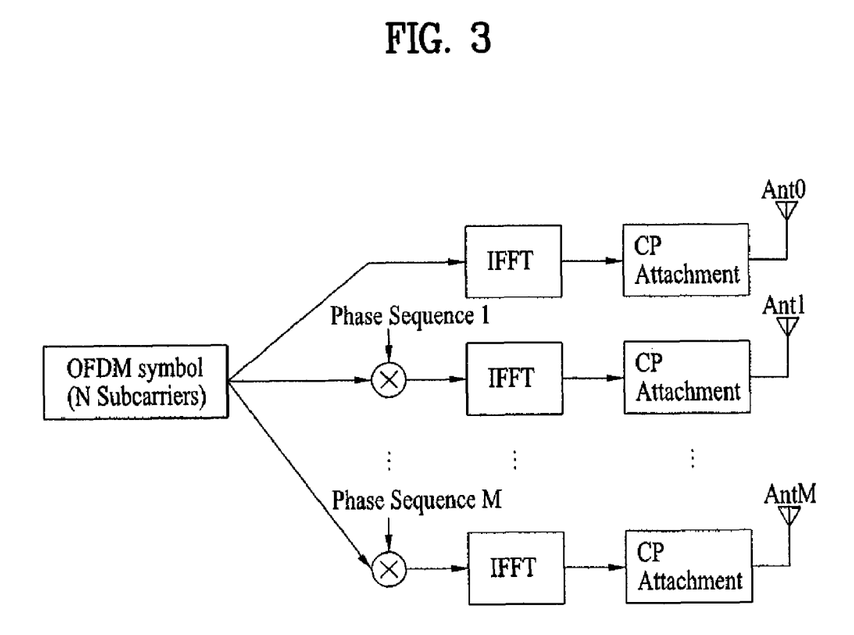
FIG. 3 is an exemplary diagram illustrating application of phase sequence.

If such a cyclic delay diversity scheme is applied in the frequency domain, the cyclic delay can be expressed by multiplying of a phase sequence. FIG. 3 is an exemplary diagram illustrating application of phase sequence. Referring to FIG. 3, phase sequences (e.g., phase sequence 1~phase sequence M), each of which are configured differently per antenna in the frequency domain, are multiplied and then applied to an inverse fast Fourier transform (IFFT). Thereafter, the transformed data can be transmitted to the receiver, and this process of FIG. 3 can be referred to as a phase shift diversity scheme.

If the phase shift diversity scheme is used, a flat fading channel can be converted to a frequency selection channel. In addition, a frequency diversity gain can be achieved through channel encoding, and/or a multiple user diversity gain can be achieved through frequency selection scheduling.

Second, the precoding scheme includes a codebook-based precoding scheme and a quantization scheme. More specifically, the codebook-based precoding scheme can be used if a fixed amount of feedback information of the closed-loop system is fed back. In addition, the quantization scheme can be used to feed back quantized channel information. The codebook-based precoding scheme sends as feedback information an index of precoding matrix, which is known to both the transmitter and the receiver, to the transmitter so as to achieve SNR gain.

Figure 4:
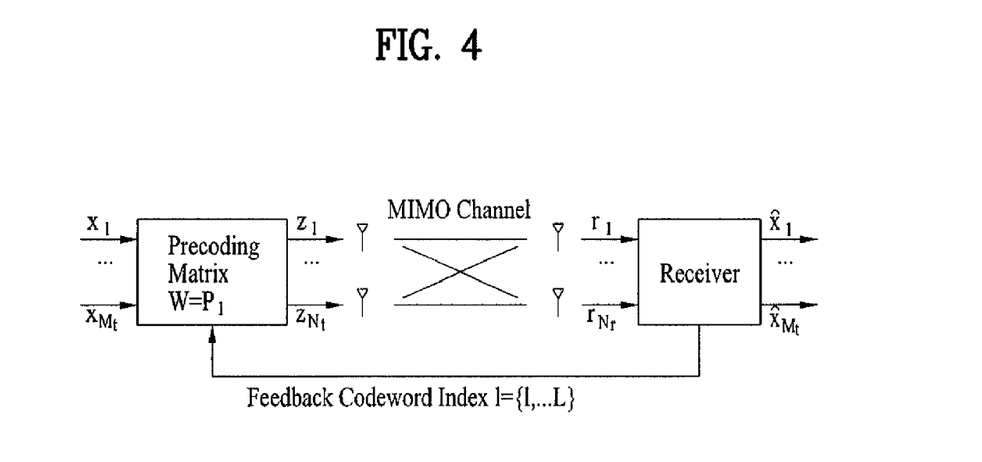
FIG. 4 is an exemplary diagram illustrating a transmitter and a receiver of a multiple antenna system using a codebook-based precoding scheme.

FIG. 4 is an exemplary diagram illustrating a transmitter and a receiver of a multiple antenna system using a codebook-based precoding scheme. Referring to FIG. 4, the transmitter and the receiver each has limited number of precoding matrix (e.g., $P_1$-$P_L$). In operation, the receiver uses the channel information to send as feedback information to the transmitter an optimum precoding matrix index (e.g., "index l"). In response, the transmitter applies index 1 to the corresponding transmit data ($X_1$-$X_{Mt}$) of the precoding matrix.

Table 1 is an example of a codebook that can be applied when a 3-bit feedback information is used in a system (e.g., IEEE 802.16e system) which supports two (2) transmit antennas and spatial multiplexing rate of 2.

TABLE 1

| Matrix Index (binary) | Column 1 | Column 2 |
|---|---|---|
| 000 | 1 | 0 |
|  | 0 | 1 |
| 001 | 0.7940 | −0.581 − j0.1818 |
|  | −0.5801 + j0.1818 | −0.7940 |
| 010 | 0.7940 | 0.0576 − j0.6051 |
|  | 0.0576 + j0.6051 | −0.7940 |
| 011 | 0.7941 | −0.2978 + j0.5298 |
|  | −0.2978 − j0.5298 | −0.7941 |
| 100 | 0.7941 | 0.6038 − j0.0689 |
|  | 0.6038 + j0.0689 | −0.7941 |
| 101 | 0.3289 | 0.6614 − j0.6740 |
|  | 0.6614 + j0.6740 | −0.3289 |
| 110 | 0.5112 | 0.4754 + j0.7160 |
|  | 0.4754 − j0.7160 | −0.5112 |
| 111 | 0.3289 | −0.8779 + j0.3481 |
|  | −0.8779 − j0.3481 | −0.3289 |

As discussed, the phase shift diversity scheme can be used to achieve frequency selection diversity gain in a closed loop and can also achieve frequency scheduling diversity gain. However, the spatial multiplexing rate is 1 for the phase shift diversity scheme and therefore, it cannot be expected to transmit data at a high transmit rate. In addition, it may be difficult to expect frequency selection and frequency scheduling diversity gains with the phase shift diversity scheme if the resources are fixedly allocated.

Further, the codebook-based precoding scheme, as discussed, can use a small amount of feedback information (or index information) and have a high spatial multiplexing rate thus can effectively transmit data. However, since this scheme requires a stable channel condition due to its reliance on feedback information, this scheme may experience difficulties if the channel condition is unstable. Moreover, this codebook-based precoding scheme is limited to application in the closed-loop systems only.

To address these potential problems associated with the phase shift diversity scheme and/or the codebook-based precoding scheme, the following discussions will be provided.

Figure 5:
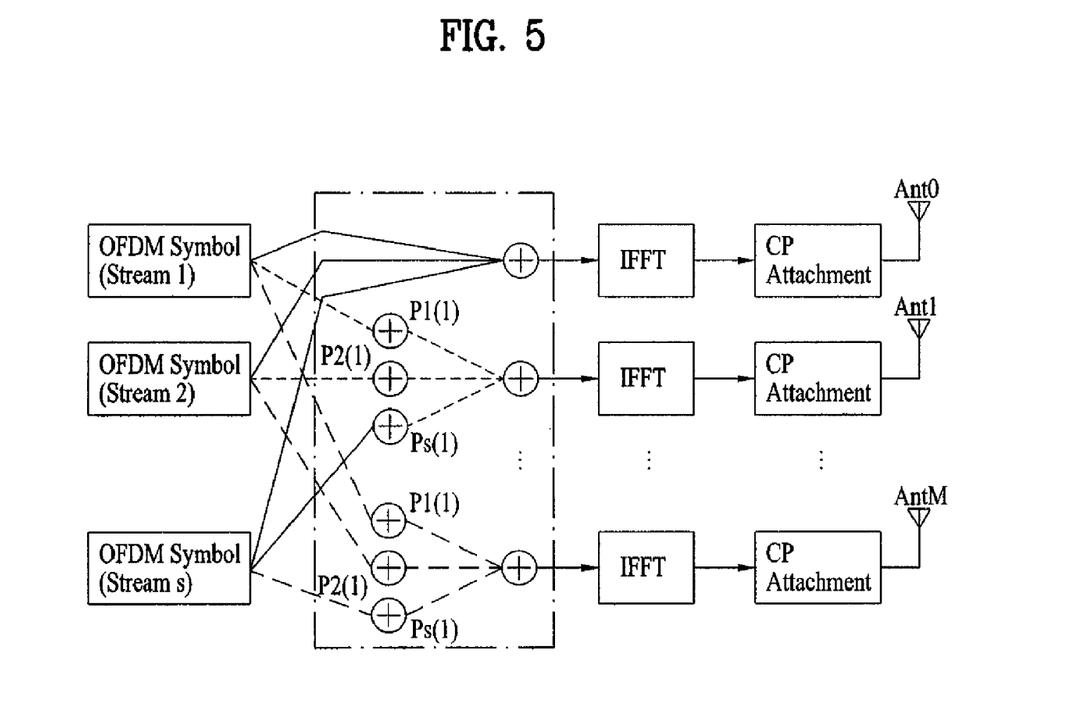
FIG. 5 is an exemplary diagram illustrating a transmitter and a receiver for performing phase shift-based precoding.

FIG. 5 is an exemplary diagram illustrating a transmitter and a receiver for performing phase shift-based precoding. More specifically, the phase shift-based precoding refers to multiplying different phase sequence to the data streams to be transmitted via each of the plurality of antennas. Generally, a small cyclic delay values are used to generate phase sequence. In such a case, from the receiver's perspective, the frequency selection diversity can be attained, and the size of the channel increases or decreases depending on the frequency domain.

Referring to FIG. 5, the transmitter can achieve scheduling diversity by allocating the receivers (e.g., mobile devices) to parts of frequency domain where the channel condition is good (or acceptable). Here, certain parts of the frequency domain has a large frequency bandwidth and is less affected by fluctuations caused by relative small cyclic delay values. In order to apply cyclic delay values which increases or decreases uniformly to each antenna, the phase shift-based precoding matrix, P, can be used as expressed as in Equation 1.

$$P_{N_t \times R}^k = \begin{pmatrix} w_{1,1}^k & w_{1,2}^k & \cdots & w_{1,R}^k \\ w_{2,1}^k & w_{2,2}^k & \cdots & w_{2,R}^k \\ \vdots & \vdots & \ddots & \vdots \\ w_{N_t,1}^k & w_{N_t,2}^k & \cdots & w_{N_t,R}^k \end{pmatrix}$$ [Equation 1]

Referring to Equation 1, k denotes index of subcarriers or index of a specific frequency bandwidth, and $w_{i,j}^k$ (i=1, ..., $N_t$, j=1, 1, ..., R) denotes a complex weight determined according to k. Moreover, $N_t$ denotes a number of transmit antennas or virtual antennas while R denotes spatial multiplexing rate. Here, the complex weight value can be variable according to the index of the OFDM symbols and corresponding subcarriers multiplied to antennas. In addition, the complex weight value can be determined by channel condition and/or feedback information. Preferably, the precoding matrix, P, of Equation 1 is configured using a unitary matrix so as to reduce loss in channel capacity of a multi-antenna system.

The following equation can be used to express a channel capacity of a multi-antenna closed-loop system so as to define the elements (or components) of the unitary matrix.

$$Cu(H) = \log_2\left(\det\left(I_{N_r} + \frac{SNR}{N}HH^H\right)\right)$$ [Equation 2]

Referring to Equation 2, H denotes a multi-antenna channel matrix having a size of $N_r \times N_t$, and $N_r$ denotes a number of receiving antennas. If Equation 2 is applied to the phase shift-based precoding matrix P, the result can be expressed as shown in Equation 3.

$$C_{precoding} = \log_2\left(\det\left(I_{N_r} + \frac{SNR}{N}HPP^H H^H\right)\right)$$ [Equation 3]

Referring to Equation 3, in order to minimize or eliminate channel capacity loss, $PP^H$ must be an identity matrix. As such, the phase shift-based matrix P has to satisfy the following condition of Equation 4.

$$PP^H = I_N$$ [Equation 4]

In order for the phase shift-based precoding matrix P to be converted to an identity matrix, two (2) conditions need to be met. That is, a power limitation condition and orthogonality limitation condition need to be met simultaneously. The power limitation condition relates to making the size of each column of the matrix to equal 1. Moreover, the orthogonality limitation condition relates to making each column orthogonal (or the columns are orthogonal to each other). Equation 5 and Equation 6 are examples of these.

$$|w_{1,1}^k|^2 + |w_{2,1}^k|^2 + \ldots + |w_{N_i,1}^k|^2 = 1,$$ [Equation 5]
$$|w_{1,2}^k|^2 + |w_{2,2}^k|^2 + \ldots + |w_{N_i,2}^k|^2 = 1,$$
$$\vdots$$
$$|w_{1,R}^k|^2 + |w_{2,R}^k|^2 + \ldots + |w_{N_i,R}^k|^2 = 1$$

$$w_{1,1}^{k*}w_{1,2}^k + w_{2,1}^{k*}w_{2,2}^k + \ldots + w_{N_i,1}^{k*}w_{N_i,2}^k = 0,$$ [Equation 6]
$$w_{1,1}^{k*}w_{1,3}^k + w_{2,1}^{k*}w_{2,3}^k + \ldots + w_{N_i,1}^{k*}w_{N_i,3}^k = 0,$$
$$\vdots$$
$$w_{1,1}^{k*}w_{1,R}^k + w_{2,1}^{k*}w_{2,R}^k + \ldots + w_{N_i,1}^{k*}w_{N_i,R}^k = 0$$

The discussions above with respect to Equations 2-6 relate to a unitary matrix. Hereafter, the discussions of the unitary matrix relate to a phase shift-based precoding matrix having a 2×2 matrix size.

Equation 7 represents a general phase shift-based precoding matrix having a spatial multiplexing rate of 2 with respect to two (2) transmit antennas.

$$P_{2\times 2}^k = \begin{pmatrix} \alpha_1 e^{jk\theta_1} & \beta_1 e^{jk\theta_2} \\ \beta_2 e^{jk\theta_3} & \alpha_2 e^{jk\theta_4} \end{pmatrix}$$ [Equation 7]

Referring to Equation 7, $\alpha_i$, $\beta_i$ (i=1, 2) represents real numbers, $\theta_i$ (i=1, 2, 3, 4) denotes a phase value, and k denotes subcarrier index of OFDM signals.

In order to convert such a precoding matrix (e.g., Equation 7) into a unit matrix, the power limitation condition of Equation 8 and the orthogonality limitation condition of Equation 9 need to be satisfied.

$$|\alpha_1 e^{jk\theta_1}|^2 + \beta_2 e^{jk\theta_3}|^2 + |\beta_1 e^{jk\theta_2}|^2 = 1$$ [Equation 8]

$$|\alpha_1 e^{jk\theta_1}|^* + \beta_1 e^{jk\theta_2} = 1 + (\beta_2 e^{jk\theta_3})^* = \alpha_2 e^{jk\theta_4} = 0$$ [Equation 9]

In Equations 8 and 9, * denotes a conjugate complex number. If the phase shift-based precoding matrix having a size of 2×2 satisfies Equations 7-9, such a matrix can be expressed as follows as shown in Equation 10.

$$p_{2\times 2}^k = \frac{1}{\sqrt{2}}\begin{pmatrix} 1 & e^{jk\theta_2} \\ e^{jk\theta_3} & 1 \end{pmatrix}$$ [Equation 10]

Referring to Equation 10, $\theta_2$ and $\theta_3$ maintain an orthogonal relationship based on satisfying the orthogonality limitation condition. This can be expressed as shown in Equation 11.

$$k\theta_3 = -k\theta_2 + \pi$$ [Equation 11]

The precoding matrix can be stored in the transmitter and the receiver in a form of a codebook. The codebook can include various precoding matrix generated using a specified number of different $\theta_2$ values. Here, $\theta_2$ value can be configured based on the channel conditions and whether feedback information is provided or not. If the feedback information is provided (or used), $\theta_2$ value can be configured to be a small value. If the feedback information is not provided (or not used), $\theta_2$ value can be configured to be a large value so as to attain high frequency diversity gain.

Figure 6:
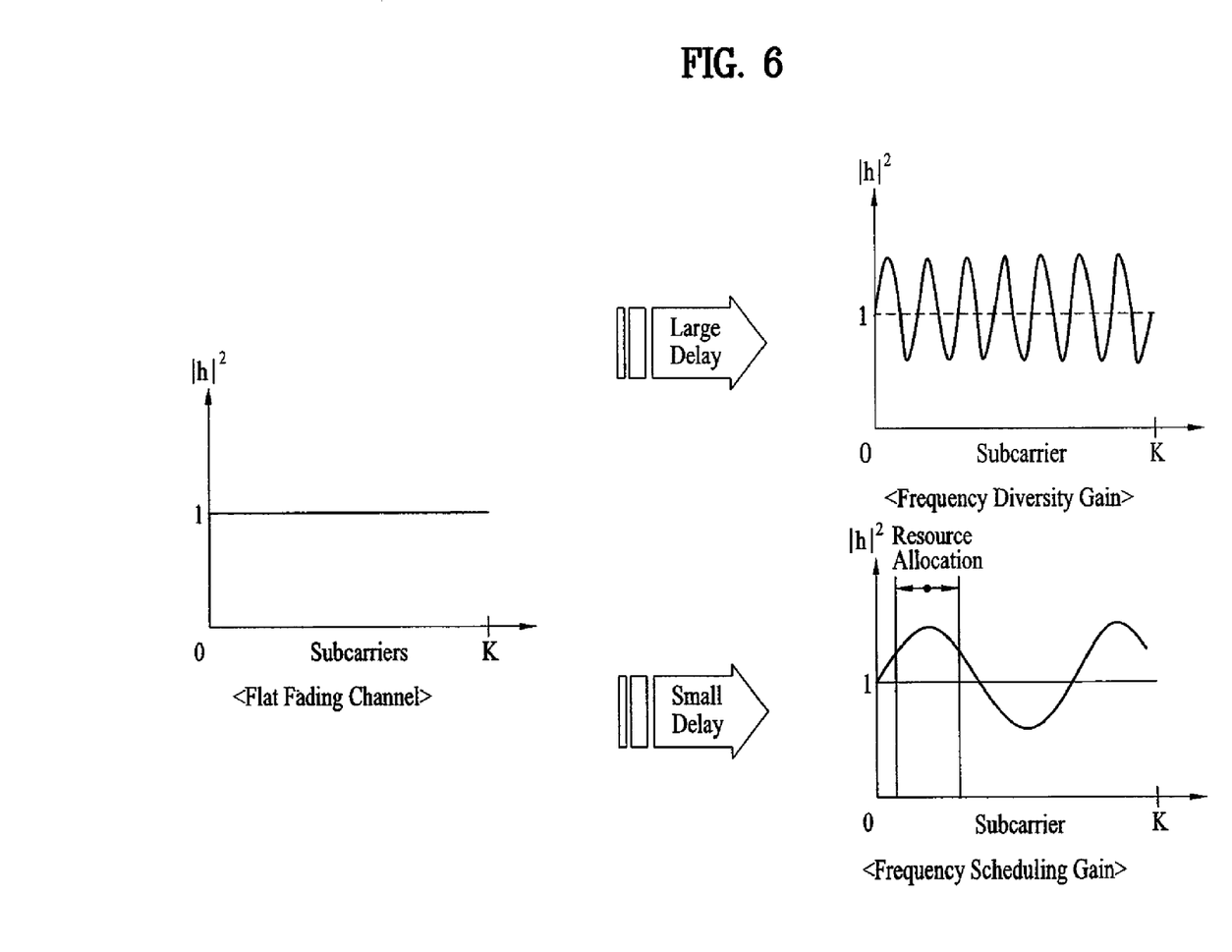
FIG. 6 is an exemplary diagram illustrating two (2) types phase shift-based precoding based on delay sample size.

Further, frequency diversity gain and/or frequency scheduling gain can be achieved according to the delay sample size applied to the phase shift-based precoding matrix. FIG. 6 is an exemplary diagram illustrating two (2) types phase shift-based precoding based on delay sample size.

Referring to FIG. 6, if a large delay sample size (or cyclic delay) is used, a frequency diversity gain for channel symbols can be achieved by the frequency selection cycle becoming higher due to the frequency selection becoming shorter. It is preferable to use the large delay sample in an open-loop system in which feedback information is less reliable due to severe temporal fluctuations with respect to channels.

Furthermore, if a small delay sample value is used, there can be channels from the frequency selection channels whose channel sizes are increased or decreased in the flat fading channel(s). Moreover, if the channel sizes of the specified subcarrier domain of the OFDM signal increases, then the channel sizes of the other subcarrier domain of the OFDM signal decreases. In other words, there is an inverse relationship.

In such a case, with respect to an orthogonal frequency division multiple access (OFDMA) system, the SNR can be increased if the signal is transmitted via the frequency band whose channel sizes have increased per each user. In addition, the frequency bandwidth having increased channel sizes may be different for each user, and as a result, the system can achieve scheduling diversity with respect to multiple users. Furthermore, the receiver only needs to send feedback information related to channel quality information (CQI) of subcarriers which can be resource allocated. Consequently, the size of the feedback information can be decreased as well.

The delay sample (or cyclic delay) for the phase shift-based precoding can be a predetermined value at the transmitter and the receiver or can be provided via feedback information from the receiver to the transmitter. Furthermore, the spatial multiplexing rate, R, can be a predetermined value at the transmitter and the receiver or can be provided as feedback information by the receiver to the transmitter after the receiver calculates the spatial multiplexing rate upon periodically measuring the channel conditions. Here, the transmitter can use the channel information fed back from the receiver to calculate and/or manipulate the spatial multiplexing rate.

Generalized Phase Shift Diversity (GPSD)

The phase shift-based precoding matrix, as described above, is based on a system with $N_t$ number of antennas ($N_t$ greater than or equal to 2 and is a natural number) and the spatial multiplexing rate R (R>1 and is a natural number). Such a system can be expressed according to Equation 12.

$$GPSD^k_{N_t \times R} = \begin{pmatrix} w^k_{1,1} & w^k_{1,2} & \cdots & w^k_{1,R} \\ w^k_{2,1} & w^k_{2,2} & \cdots & w^k_{2,R} \\ \vdots & \vdots & \ddots & \vdots \\ w^k_{N_t,1} & w^k_{N_t,2} & \cdots & w^k_{N_t,R} \end{pmatrix}$$ [Equation 12]

-continued
$$= \begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & 0 & e^{j\theta_{N_t} k} \end{pmatrix} (U^k_{N_t \times R})$$

Referring to Equation 12, $GPSD^k_{N_t \times R}$ represents a generalized phase shift diversity (GPSD) matrix for $k^{th}$ subcarrier of a MIMO-OFDM signal having $N_t$ number of transmit antennas and spatial multiplexing rate R. Moreover, $GPSD^k_{N_t \times R}$ is a unitary matrix which satisfies $U^H_{N_t \times R} \times U_{N_t \times R} = I_{R \times R}$ and can be used to minimize inter-symbol interference between subcarrier symbols. In particular, $U_{N_t \times R}$ should also satisfy the unitary matrix condition so that the unitary matrix characteristics of the diagonal matrix for the phase shift can be maintained.

Equation 13 represents the relationship between the phase angle $\theta_i$, $i=1, \ldots, N_t$ of the frequency domain and the time delay $\tau_i$, $i=1, \ldots, N_t$ of the time domain of Equation 12.

$$\theta_i = \frac{-2\pi}{N_{\mathit{fft}}} \cdot \tau_i$$ [Equation 13]

Referring to Equation 13, $N_{\mathit{fft}}$ denotes a number of subcarriers of the OFDM signal.

As an example of Equation 12, Equation 14 represents a system with two (2) transmit antennas or virtual antennas using a 1-bit codebook.

$$GPSD^k_{2 \times 2} = \begin{pmatrix} \alpha & \beta \\ \beta & -\alpha \end{pmatrix}, \alpha^2 + \beta^2 = 1$$ [Equation 14]

Referring to Equation 14, since $\beta$ can be determined relatively easily once $\alpha$ is determined, $\alpha$ can be pre-set with two (2) values and the information regarding the pre-set values can be fed back in form of codebook index. For example, if the feedback codebook index is 0, $\alpha$ can be 0.2, and if the feedback codebook index is 1, then $\alpha$ can be 0.8. Such values can be agreed and shared between the transmitter and the receiver.

With respect to Equation 12, as an example of the unitary matrix $U_{N_t \times R}$, a specific precoding matrix (e.g., Walsh Hadamard matrix or discrete Fourier transform) can be used to achieve SNR diversity.

If the Walsh Hadamard matrix is used, an example of GPSD matrix with respect to Equation 12 can be expressed in Equation 15.

$$GPSD^k_{4 \times 4} =$$ [Equation 15]
$$\frac{1}{\sqrt{4}} \begin{pmatrix} e^{j\theta_1 k} & 0 & 0 & 0 \\ 0 & e^{j\theta_2 k} & 0 & 0 \\ 0 & 0 & e^{j\theta_3 k} & 0 \\ 0 & 0 & 0 & e^{j\theta_4 k} \end{pmatrix} \begin{pmatrix} 1 & 1 & 1 & 1 \\ 1 & -1 & 1 & -1 \\ 1 & 1 & -1 & -1 \\ 1 & -1 & -1 & 1 \end{pmatrix}$$

Referring to Equation 15, this equation is based on four (4) transmit or virtual antennas and a spatial multiplexing rate of 4. Here, the second matrix to the right of the equal sign (e.g., represented in 1 s and −1 s) can be reconfigured to select a specific antenna (e.g., antenna selection) and/or adjust spatial multiplexing rate (e.g., rate tuning). The unitary matrix $U_{N_t \times R}$ of Equation 12 can be provided to the transmitter and the receiver in a codebook format. Here, the transmitter can receive the index information of the codebook from the receiver. Thereafter, the transmitter can select a unitary matrix of the corresponding index from the codebook and apply Equation 12 to configure the phase shift-based precoding matrix.

Equation 16 represents reconfigured unitary matrix for selecting two (2) antennas in a system having four (4) transmit or virtual antennas.

$$P_{4 \times 4}^k = \frac{1}{\sqrt{4}} \begin{pmatrix} e^{j\theta_1 k} & 0 & 0 & 0 \\ 0 & e^{j\theta_2 k} & 0 & 0 \\ 0 & 0 & e^{j\theta_3 k} & 0 \\ 0 & 0 & 0 & e^{j\theta_4 k} \end{pmatrix} \begin{pmatrix} 0 & 0 & 1 & 1 \\ 0 & 0 & 1 & -1 \\ 1 & 1 & 0 & 0 \\ 1 & -1 & 0 & 0 \end{pmatrix} \quad \text{[Equation 16]}$$

Further, the following Table 2 shows a method for reconfiguring the unitary matrix according to the corresponding multiplexing rate if the spatial multiplexing rate changes due to variance in time and/or channel conditions.

TABLE 2

Multiplexing Rate 1, Multiplexing Rate 4, Multiplexing Rate 2

$$P_{4 \times 4}^k = \frac{1}{\sqrt{4}} \begin{pmatrix} e^{j\theta_1 k} & 0 & 0 & 0 \\ 0 & e^{j\theta_2 k} & 0 & 0 \\ 0 & 0 & e^{j\theta_3 k} & 0 \\ 0 & 0 & 0 & e^{j\theta_4 k} \end{pmatrix} \begin{pmatrix} 1 & 1 & 1 & 1 \\ 1 & -1 & 1 & -1 \\ 1 & 1 & -1 & -1 \\ 1 & -1 & -1 & 1 \end{pmatrix}$$

Referring to Table 2, the first column, the first and second columns, and/or first through fourth columns are selected according to the multiplexing rate (e.g., multiplexing rate of 1, 2, or 4). However, the multiplexing rate (or selection of columns) is not limited to the example of Table 2, but the multiplexing rate can be one (1) and any one of the four columns can be selected. Moreover, if the multiplexing rate is two (2), any two columns of the four columns (e.g., 1-2, 2-3, 3-4, or 4-1) can be selected.

In the example above, the Walsh Hadamard matrix is used. The following example shows a GPSD matrix to which a unitary matrix $U_{N_t \times R}$ having 2×2 or 4×4 Walsh code is applied with respect to Equation 12. Here, Table 2 refers to the 2×2, and Table 3 refers to 4×4.

TABLE 3

2 Tx

| Rate 1 | Rate 2 |
|---|---|
| $\frac{1}{\sqrt{2}}\begin{bmatrix} 1 \\ e^{j\theta_1 k} \end{bmatrix}$ | $\frac{1}{\sqrt{2}}\begin{bmatrix} 1 & 1 \\ e^{j\theta_1 k} & -e^{j\theta_1 k} \end{bmatrix}$ |

TABLE 4

4 Tx

| Rate 1 | rate 2 | Rate 4 |
|---|---|---|
| $\frac{1}{2}\begin{bmatrix} 1 \\ e^{j\theta_1 k} \\ e^{j\theta_2 k} \\ e^{j\theta_3 k} \end{bmatrix}$ | $\frac{1}{2}\begin{bmatrix} 1 & 1 \\ e^{j\theta_1 k} & -e^{j\theta_1 k} \\ e^{j\theta_2 k} & e^{j\theta_2 k} \\ e^{j\theta_3 k} & -e^{j\theta_3 k} \end{bmatrix}$ | $\frac{1}{2}\begin{bmatrix} 1 & 1 & 1 & 1 \\ e^{j\theta_1 k} & -e^{j\theta_1 k} & e^{j\theta_1 k} & -e^{j\theta_1 k} \\ e^{j\theta_2 k} & e^{j\theta_2 k} & -e^{j\theta_2 k} & -e^{j\theta_2 k} \\ e^{j\theta_3 k} & -e^{j\theta_3 k} & -e^{j\theta_3 k} & e^{j\theta_3 k} \end{bmatrix}$ |

Time Variable GPSD

The phase angle $\theta_i$ and/or the unitary matrix U of the GPSD matrix of Equation 12 can be changed according to time. In other words, the phase angle $\theta_i$ and/or the unitary matrix U may be time dependent. As an example of a time variable GPSD with respect to Equation 12 can be expressed as shown in Equation 17.

$$GPSD_{N_t \times R}^k(t) = \begin{pmatrix} e^{j\theta_1(t)k} & 0 & \cdots & 0 \\ 0 & e^{j\theta_2(t)k} & \cdots & 0 \\ \vdots & \vdots & \ddots & 0 \\ 0 & 0 & 0 & e^{j\theta_{N_t}(t)k} \end{pmatrix} (U_{N_t \times R}(t)) \quad \text{[Equation 17]}$$

Referring to Equation 17, $GPSD_{N_t \times R}^k(t)$ represents the GPSD matrix for $k^{th}$ subcarrier of a MIMO-OFDM signal having $N_t$ number of transmit/virtual antennas and spatial multiplexing rate R in a specific time t. Moreover, $\mathbb{U}_{N_t \times R}(t)$ is a unitary matrix which satisfies $U_{N_t \times R}^H \times U_{N_t \times R} = \mathbb{I}_{R \times R}$ and can be used to minimize inter-symbol interference between subcarrier symbols. In particular, $\mathbb{U}_{N_t \times R}(t)$ should also satisfy the unitary matrix condition so that the unitary matrix characteristics of the diagonal matrix for the phase shift can be maintained.

Equation 18 represents the relationship between the phase angle $\theta i$, $i = 1, \ldots, N_t$ of the frequency domain and the time delay $\tau_i$, $i = 1, \ldots, N_t$ of the time domain of Equation 12.

$$\theta_i = \frac{-2\pi}{N_{fft}} \cdot \tau_i(t) \quad \text{[Equation 18]}$$

Referring to Equation 18, $N_{fft}$ denotes a number of subcarriers of the OFDM signal.

As shown in Equations 17 and 18, the time delay sample value and the unitary matrix can change with passage of time, and the time unit can be expressed in OFDM symbol unit or a specified time unit.

As examples of GPSD matrix to which a unitary matrix having a 2×2 or a 4×4 Walsh code is applied so as to attain a time variable GPSD can be shown in Table 5 and

TABLE 5

| 2 Tx | |
|---|---|
| Rate 1 | Rate 2 |
| $\begin{bmatrix} 1 \\ e^{j\theta_1(t)k} \end{bmatrix}$ | $\begin{bmatrix} 1 & 1 \\ e^{j\theta_1(t)k} & -e^{j\theta_1(t)k} \end{bmatrix}$ |

TABLE 6

| 4 Tx | | |
|---|---|---|
| Rate 1 | Rate 2 | Rate 4 |
| $\begin{bmatrix} 1 \\ e^{j\theta_1(t)k} \\ e^{j\theta_2(t)k} \\ e^{j\theta_3(t)k} \end{bmatrix}$ | $\begin{bmatrix} 1 & 1 \\ e^{j\theta_1(t)k} & -e^{j\theta_1(t)k} \\ e^{j\theta_2(t)k} & e^{j\theta_2(t)k} \\ e^{j\theta_3(t)k} & -e^{j\theta_3(t)k} \end{bmatrix}$ | $\begin{bmatrix} 1 & 1 & 1 & 1 \\ e^{j\theta_1(t)k} & -e^{j\theta_1(t)k} & e^{j\theta_1(t)k} & -e^{j\theta_1(t)k} \\ e^{j\theta_2(t)k} & e^{j\theta_2(t)k} & -e^{j\theta_2(t)k} & -e^{j\theta_2(t)k} \\ e^{j\theta_3(t)k} & -e^{j\theta_3(t)k} & -e^{j\theta_3(t)k} & e^{j\theta_3(t)k} \end{bmatrix}$ |

Enhanced GPSD

A third (3) matrix can be added to the GPSD matrix comprising a diagonal matrix and a unitary matrix, as shown in Equation 12, to form an enhanced GPSD matrix. The enhanced GPSD matrix can be expressed as shown in Equation 19.

$$GPSD_{N_t \times R}^k = (\mathbb{P}_{N_t \times R}) \begin{pmatrix} e^{j\theta_1 k} & 0 & \cdots & 0 \\ 0 & e^{j\theta_2 k} & \cdots & 0 \\ \vdots & \vdots & \ddots & \vdots \\ 0 & 0 & \cdots & e^{j\theta_R k} \end{pmatrix} (\mathbb{U}_{R \times R}) \quad \text{[Equation 19]}$$

Referring to Equation 19 and compared to Equation 12, the enhanced GPSD matrix includes a precoding matrix P, having a size of $N_t \times R$, in front of the diagonal matrix. Consequently, the size of the diagonal matrix become R×R. Furthermore, the newly added precoding matrix $P_{N_t \times R}$ can be configured differently for a specified frequency bandwidth or a specified subcarrier symbol. Moreover, the newly added precoding matrix $P_{N_t \times R}$ can be configured as unitary matrix in a closed-loop system. With the addition or inclusion of the precoding matrix $P_{N_t \times R}$, optimized SNR gain can be achieved.

In addition, the transmitter and the receiver can be provided with a codebook which includes a plurality of the precoding matrix $P_{N_t \times R}$.

In the enhanced GPSD matrix, at least one of the precoding matrix P, the phase angle θ of the diagonal matrix, and the unitary matrix U can be changed with respect to time. To this end, if the index of the subsequent (or next) precoding matrix P is fed back to the transmitter in terms of a prescribed time unit or a prescribed subcarrier unit, a specific precoding matrix P from the corresponding index from the codebook can be selected. In such a case, the enhanced GPSD matrix can be expressed as shown in Equation 20.

$$GPSD_{N_t \times R}^k(t) = \quad \text{[Equation 20]}$$
$$(\mathbb{P}_{N_t \times R}(t)) \begin{pmatrix} e^{j\theta_1(t)k} & 0 & \cdots & 0 \\ 0 & e^{j\theta_2(t)k} & \cdots & 0 \\ \vdots & \vdots & \ddots & \vdots \\ 0 & 0 & \cdots & e^{j\theta_R(t)k} \end{pmatrix} (\mathbb{U}_{R \times R}(t))$$

Referring to Equation 20, the detailed description of the enhanced GPSD is described in Korea Patent No. 10-2007-0037008, filed on Apr. 16, 2007. For this reason, the discussion of the enhanced GSPD will be omitted.

Configuration of Phase Shift Relationship Per Antenna

The discussions to follow describes the relationships between each phase angle $ON_t$ of the diagonal matrix of the GPSD, time variable GPSD, enhanced GPSD, and enhanced time possible GPSD. For simplicity, the discussion is based on the phase shift relationship per antenna with respect to the time variable GPSD but can also be applied to other forms of GPSD, as listed above.

Phase Shift Relationship
Configuration—Embodiment 1

The phase angle of the time variable GPSD can be configured to increase linearly according to the index of each antenna. The relationship between each phase angle can be expressed mathematically and can be expressed as shown in Equation 25.

$\theta_1(t)=0\cdot\theta(t), \theta_2(t)=1\cdot\theta(t)$ $\theta_3(t)=2\cdot\theta(t), \theta_4(t)=3\cdot\theta(t)$ [Equation 25]

More specifically, this embodiment can achieve high capability in a uniform linear array antenna structure. In particular, if the spatial multiplexing rate is configured or reconfigured to be small (or low) as is the case in Table 2, an optimum beamforming gain can be achieved. Furthermore, if the unitary matrix U is set or reconfigured to be an antenna selection type as shown in Equation 16, high gain can be achieved.

Phase Shift Relationship
Configuration—Embodiment 2

The phase angle of the time variable GPSD can be configured to have the same phase angle by alternating the phase angle between even numbered antennas and the odd numbered antennas. In a system having four (4) antennas, the relationship between each phase angle can be expressed mathematically as shown in Equation 26.

$\theta_1(t)=0\cdot\theta(t), \theta_2(t)=1\cdot\theta(t)$ $\theta_3(t)=0\cdot\theta(t), \theta_4(t)=1\cdot\theta(t)$ [equation 26]

Referring to Equation 26, the first antenna and the third antenna have the same phase angle and the second and the fourth antennas share the same phase angle. In this embodiment, the system can enjoy good performance in a block diagonal channel type (e.g., cross polarized antenna) if the channel power is high.

Phase Shift Relationship
Configuration—Embodiment 3

The phase angle of the time variable GPSD can be configured so that the phase angle of a specific antenna is different from the phase angle of the other antennas. For such a case, each relationship between phase angles can be expressed as shown in Equation 27.

$$\theta_1(t)=1\cdot\theta(t), \theta_2(t)=0\cdot\theta(t)$$

$$\theta_3(t)=1\cdot\theta(t), \theta_4(t)=1\cdot\theta(t) \quad \text{[Equation 27]}$$

Referring to Equation 27, if the correlation between the antenna of the second index and the other antennas is high, the phase angle of the second antenna is configured differently from the phase angles of the other antennas. According to this embodiment, high beamforming gain can be achieved if the correlation between the specific antenna and the other antennas is high.

The embodiments of above discusses configuring the relationship of phase angles of each antenna to correspond to the structure of the transmit antenna. However, the phase shift relationship per antenna can be configured differently for each antenna. Furthermore, the phase shift relationship per antenna can also be configured differently for each unit of time, and in so doing, the channel condition and/or level of interference per antenna may be considered. Lastly, the phase shift relationship per antenna can be configured to correspond to each frequency band allocated to each antenna.

Configuration of Time Delay and/or Unitary Matrix

With respect to time delay $\tau_i$ and unitary matrix UNIXR of GPSD, time delay $\tau_i(t)$ and unitary matrix $U_{Nt \times R}(t)$ of the time variable GPSD, and time delay $\tau_i$, $\tau_i(t)$) and unitary matrix ($U_{Nt \times R}$, $U_{Nt \times R}(t)$) of enhanced GPSD can be determined differently or independently according to various conditions. Discussed below is related to the time delay and/or unitary matrix of the GPSD; however, the same discussion can be applied to the time variable GPSD and the enhanced GPSD as well.

Configuration of Time Delay and/or Unitary Matrix—Embodiment 1

Similar to the OFDM system, if different frequency band (e.g., 1.25 MHz, 5 MHz, 10 MHz, . . . , 100 MHz) per subcarrier is used, the time delay and/or unitary matrix of the GPSD can be configured differently according to each system bandwidth. Moreover, the time delay can use the same value for a specified period of time regardless of the frequency band, and only the unitary matrix can be configured differently according to each frequency band. In short, the time delay and the unitary matrix of the GPSD can be configured independently.

Configuration of Time Delay and/or Unitary Matrix—Embodiment 2

If a base station (BS) assigns and notifies a mobile station (MS) of a specific time and/or a specific unitary matrix, the MS can then configure time delay and/or unitary matrix as provided from the BS and transmit accordingly.

If the amount of data (e.g., feedback information) received by the BS exceeds the size of the buffer, then the MS may need to re-transmit the data, for example. Taking into consideration such possibilities, values associated with a specific time delay and/or unitary matrix can be determined.

Configuration of Time Delay and/or Unitary Matrix—Embodiment 3

The BS can refer to the feedback information sent from the MS in determining the time delay and/or the unitary matrix. Moreover, the BS can use the determined time delay and/or the unitary matrix to transmit data in the downlink direction. The feedback information can be transmitted periodically, and the BS can reconfigure the time delay and/or the unitary matrix each time the feedback information is received.

Configuration of Time Delay and/or Unitary Matrix—Embodiment 4

The time delay of the GPSD can be configured differently based on the size of the allocated resource to the transmitter (e.g., BS or MS). For example, if the size of the resources allocated to the transmitter is large, the possibility of subcarrier interference occurring may be small, hence the time delay can be set to 0 or to a relatively smaller value. Alternatively, if the size of the allocated resources is small, a larger time delay value can be set so as to reduce inter-subcarrier inference.

Configuration of Time Delay and/or Unitary Matrix—Embodiment 5

A specific unitary matrix can be selected as the unitary matrix of the GPSD by the BS. More specifically, a specific column of the selected unitary matrix can be selected and/or used.

As shown in Table 2, a number of columns can be determined according to the multiplexing rate during data transmission. The BS can determine the specific unitary matrix to be used by the GPSD and can refer to the multiplexing rate fed back from the MS in order to determine a number of columns corresponding to the multiplexing rate for the selected unitary matrix. In addition, the BS can notify to the MS information on the selected unitary matrix (or index of the unitary matrix) and information on the selected column (or sub-index for the column) of the corresponding unitary matrix.

Here, if the amount of data (e.g., feedback information) received by the BS exceeds the size of the buffer, then the MS may need to re-transmit the data, for example. Taking into consideration such possibilities, a specific column of the specific unitary matrix and/or corresponding unitary matrix can be selected.

Configuration of Time Delay and/or Unitary Matrix—Embodiment 6

The time delay and the unitary matrix of the GPSD can be executed according to a method in which the BS provides the necessary values to the MS during network entry and the MS uses the provided values to transmit the data. Alternatively, the BS can determine the necessary values and uses these values to transmit data in the downlink direction.

Configuration of Time Delay and/or Unitary Matrix—Embodiment 7

The time delay of the GPSD can be configured differently based on the multiplexing rate. For example, if the multiplexing rate is 1, the time delay can be set to ½, and if the multiplexing rate is 2, the time delay can be set to ¼. The present embodiment can be used in connection with Embodiment 5 in which a specific column from the unitary matrix is selected.

Configuration of Time Delay and/or Unitary Matrix—Embodiment 8

The time delay of the GPSD can be configured differently according to a data allocation scheme. For example, if the signal of the MS is distributed and allocated across the frequency domain in order to achieve frequency diversity gain, the time delay can be set relatively larger to optimize the effect of the frequency diversity gain. Moreover, if the frequency scheduling gain is sought by allocating the MS signals closely together in the frequency domain and by allocating the MS signals in the frequency domain having good channel interval, the time delay can be set relatively smaller so as to optimize the scheduling gain.

Configuration of Time Delay and/or Unitary Matrix—Embodiment 9

The time delay of the GPSD can be configured differently based on the speed of mobility of the MS. For example, if the speed of the MS mobility is slow, the time delay can be set small since the inter-subcarrier interference is relatively small. Alternatively, if the speed of the MS mobility is fast, the time delay can be large since the inter-subcarrier interference is relatively large.

Configuration of Time Delay and/or Unitary Matrix—Embodiment 10

The time delay of the GPSD can be configured differently based on the types of multi antenna system. For example, if a single user MIMO is used, the time delay can be set as a small value since the need to consider the inter-subcarrier interference is relatively low, as is the case with STC. Alternatively, if multi-user MIMO (e.g., single division multiple access) is used, the time delay can be large since the allocated subcarriers between/amongst users need to be sensitive to inter-subcarrier interference.

Configuration of Time Delay and/or Unitary Matrix—Embodiment 11

The time delay of the GPSD can be configured differently according to the types of user traffic. For example, if the user traffic is an unicast traffic or a multicast traffic, the time delay can be variably set to small or large depending on the condition or status. However, if the user traffic is a broadcast traffic, the time delay can be large since the transmission is to relatively large users.

Configuration of Time Delay and/or Unitary Matrix—Embodiment 12

The time delay of the GPSD can be configured differently based on the number of MSs in a serving cell. For example, if a large number of MSs belong to a cell, the time delay can be set to a large value, and if the small number of MSs are in a cell, then the time delay can be set to a small value.

Configuration of Time Delay and/or Unitary Matrix—Embodiment 13

The time delay of the GPSD can be configured differently based on the condition or status of the cell. For example, the cell can be classified as an isolated cell (e.g., hot spot) or a multi cell, and in the isolated cell, the time delay can be set to a small value while a large value for time delay is set in the multi cell.

Configuration of Time Delay and/or Unitary Matrix—Embodiment 14

The time delay of the GPSD can be configured differently according to the size of granularity transmitted on the frequency unit or time unit. For example, if the frequency granularity is fine (e.g., fine granularity), the time delay can be set to a large value since data loss due to interference has to be considered. However, if the frequency granularity is coarse (e.g., coarse granularity), then the time delay is set to a small value. Furthermore, the same logic or scheme as the frequency granularity can be applied to time granularity.

Configuration of Time Delay and/or Unitary Matrix—Embodiment 15

The time delay of the GPSD can be configured differently based on the size of the codebook. For example, if the system uses a codebook having a small number of precoding matrices, the time delay can be set to be a large value, where as if the codebook has a large number of precoding matrices, then the time delay can be set to be a small value.

Configuration of Time Delay and/or Unitary Matrix—Embodiment 16

The time delay of the GPSD can be configured differently based on the number of transmit antennas. For example, a relatively smaller time delay value is configured in a system has a large number of transmit antennas since the time delay for each antenna has to be distributed within a fixed time-to-live (TTL) period. For the same reason but from the opposite perspective, the time delay is set to a large value if the number of the transmit antennas is small.

Configuration of Time Delay and/or Unitary Matrix—Embodiment 17

The time delay of the GPSD can be configured differently based on channel quality information sent from the MS. For example, the receiver can measure the channel quality and calculate a modulation and coding scheme (MCS) level index according to the measured channel quality. Thereafter, the MCS level index can be fed back (or transmitted) to the BS. Generally, if the MCS level index is high, which indicates acceptable channel quality, the time delay is set to a small value.

Transmitter/Receiver for Performing Phase Shift-Based Precoding

Figure 7:
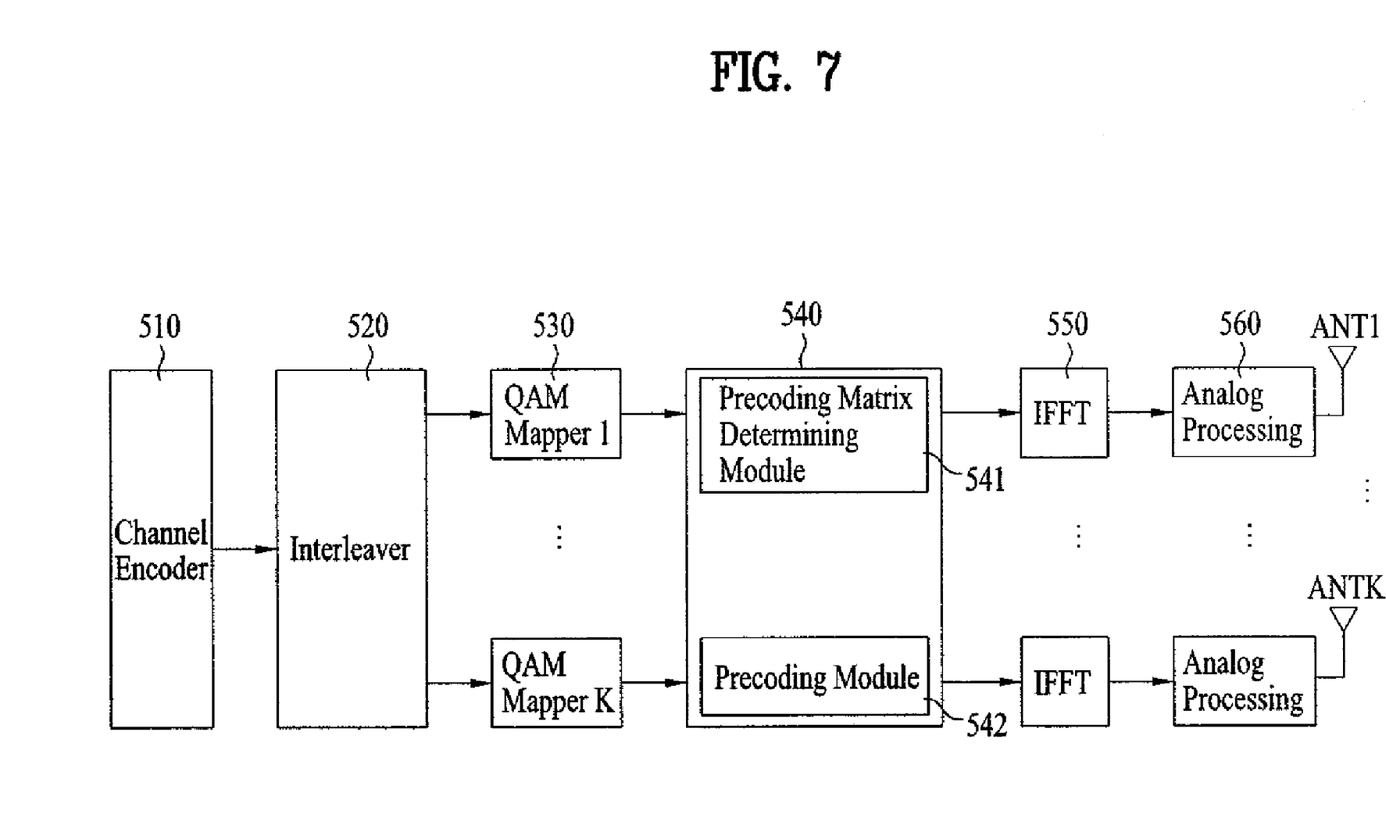
FIG. 7 is an exemplary diagram illustrating a SCW OFDM-based transmitter and a receiver using a phase shift-based precoding.
Figure 8:
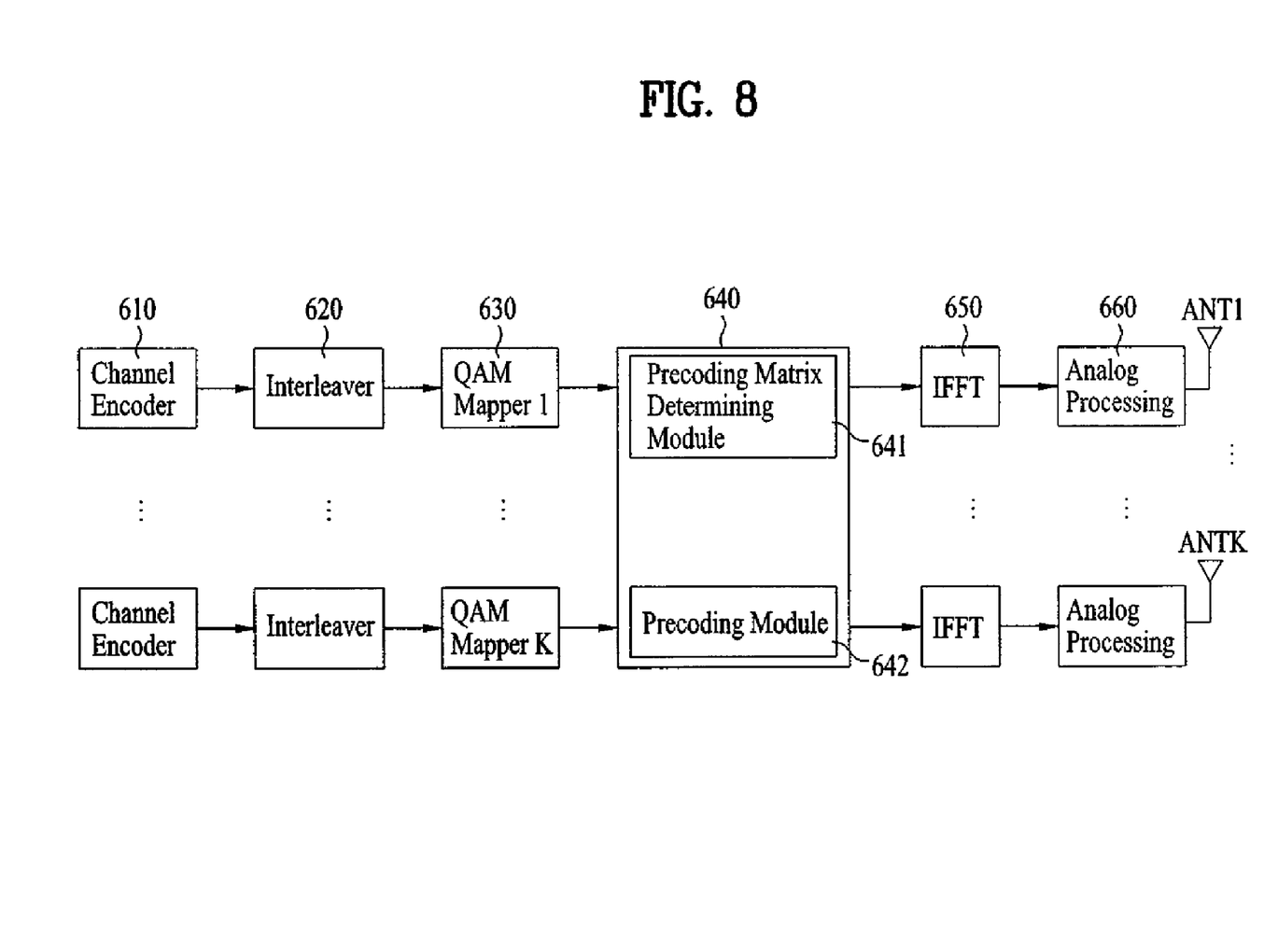
FIG. 8 is an exemplary diagram illustrating a MCW OFDM-based transmitter and a receiver using a phase shift-based precoding.

FIG. 7 is an exemplary diagram illustrating a SCW OFDM-based transmitter and a receiver using a phase shift-based precoding. FIG. 8 is an exemplary diagram illustrating a MCW OFDM-based transmitter and a receiver using a phase shift-based precoding.

Generally, the communication system comprises a transmitter and a receiver. A device which can carry out the functions of the transmitter and the receiver can be referred to as a transceiver. In other words, the transceiver is a combination of the transmitter and the receiver. However, in order to accurately describe the function of the feedback information, the transmitter and the receiver can be discussed independently.

In the downlink direction, the transmitter can be a part of the BS, and the receiver can be a part of the MS. Alternatively, the transmitter can be a part of the MS while the receiver can be a part of the BS. The BS can include a plurality of transmitters and/or receivers. Similarly, the MS can include a plurality of transmitters and/or receivers.

The functions of the receiver are opposite (or reverse) to those of the transmitter and are performed in reverse order. As such, the discussions to follow will focus on describing the functions of the transmitter.

Referring to FIGS. 7 and 8, the transmitter comprises a channel encoder (510, 610), an interleaver (520, 620), an inverser fast Fourier transform (IFFT) (550, 650), and an analog converter (560, 660), in addition to the components as described in FIG. 1. Since the functions are described with respect to FIG. 1, the discussion of those functions will be omitted. Here, the discussion of a precoder (540, 640) will be explained in detail.

The precoder (540, 640) further comprises a precoding matrix determining module (541, 641) and a precoding module (542, 642). More specifically, the precoding matrix determining module (541, 641) can be used to determine the phase shift-based precoding matrix in form of any one of Equations 12, 14, 15, 20, and 21. The details of how to determine the precoding matrix is discussed above, and therefore, further discussions will be omitted. Furthermore, the precoding matrix determining module (541, 641) can be determined according to the Phase Shift Relationship Configuration Embodiments 1-3.

In addition, the precoding module (542, 642) can be used to perform precoding operation by multiplying the OFDM symbols for corresponding subcarriers to the phase shift-based precoding matrix which is determined according to the precoding matrix determining module (541, 641).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting data to a receiver by a transmitter using a phase shift-based precoding in a multiple antenna system using a plurality of subcarriers, the method comprising:
   determining a precoding matrix (P) from a first codebook as a first part of a phase shift-based precoding matrix;
   determining a diagonal matrix (D) to provide different phase angles to each of the multiple antennas as a second part of the phase shift-based precoding matrix;
   selecting a unitary matrix (U) as a third part of the phase shift-based precoding matrix; and
   performing precoding to symbols associated with subcarriers based on the phase shift-based precoding matrix generated as P*D*U which is expressed as:

$$(\mathbb{P}_{N_t \times R}) \begin{pmatrix} e^{j\theta_1 k} & 0 & \cdots & 0 \\ 0 & e^{j\theta_2 k} & \cdots & 0 \\ \vdots & \vdots & \ddots & \vdots \\ 0 & 0 & \cdots & e^{j\theta_R k} \end{pmatrix} (\mathbb{U}_{R \times R}),$$

wherein ($P_{N_t \times R}$) denotes the precoding matrix (P), $N_t$ denotes a number of transmit antenna, ($U_{R \times R}$) denotes the unitary matrix (U), k denotes an index associated with the subcarriers, $\theta_i$(i=1, ..., R) denotes a phase angle, and R denotes a spatial multiplexing rate,
   wherein the phase angles $\theta_i$(i=1, ..., R) of the diagonal matrix (D) are linearly increased according to the index of 'i'.

2. The method of claim 1, wherein the unitary matrix (U) is selected from a second codebook.

3. The method of claim 1, wherein the diagonal matrix (D) is expressed by:

$$\begin{pmatrix} e^{j\theta_1(t)k} & 0 & \cdots & 0 \\ 0 & e^{j\theta_2(t)k} & \cdots & 0 \\ \vdots & \vdots & \ddots & \vdots \\ 0 & 0 & \cdots & e^{j\theta_R(t)k} \end{pmatrix}, \text{ and}$$

satisfies $$\theta_1(t)=0\cdot\theta(t), \theta_2(t)=1\cdot\theta(t)$$

$$\theta_3(t)=2\cdot\theta(t), \theta_4(t)=3\cdot\theta(t)$$

when the spatial multiplexing rate (R) is 4.

4. The method of claim 1, wherein time delay corresponding to the phase angle of the diagonal matrix (D) is determined differently according to a multiplexing rate.

5. An apparatus for transmitting data to a receiver using phase shift-based precoding in a multiple antenna system having a plurality of subcarriers, the apparatus comprising:
   a precoding matrix determining module configured to determine a precoding matrix (P) from a first codebook as a first part of a phase shift-based precoding matrix, determine a diagonal matrix (D) to provide different phase angles to each of the multiple antennas as a second part of the phase shift-based precoding matrix, select a unitary matrix (U) as a third part of the phase shift-based precoding matrix, and generate the phase shift-based precoding matrix P*D*U which is expressed as:

$$(\mathbb{P}_{N_t \times R}) \begin{pmatrix} e^{j\theta_1 k} & 0 & \cdots & 0 \\ 0 & e^{j\theta_2 k} & \cdots & 0 \\ \vdots & \vdots & \ddots & \vdots \\ 0 & 0 & \cdots & e^{j\theta_R k} \end{pmatrix} (\mathbb{U}_{R \times R}),$$

wherein ($P_{N_t \times R}$) denotes the precoding matrix (P), $N_t$ denotes a number of transmit antenna, ($U_{R \times R}$) denotes the unitary matrix (U), k denotes an index associated with the subcarriers $\theta_i$(i=1, ..., R) denotes a phase angle and R denotes a spatial multiplexing rate; and
   a precoding module configured to perform precoding to symbols of corresponding subcarriers based on the phase shift-based precoding matrix,
   wherein the phase angles $\theta_i$(i=1, ..., R) of the diagonal matrix (D) are linearly increased according to the index of 'i'.

6. The apparatus of claim 5, wherein the precoding matrix determining module selects the unitary matrix (U) from a second codebook.

7. The apparatus of claim 5, wherein a time delay corresponding to the phase angle of the diagonal matrix (D) is determined differently according to a multiplexing rate.

8. The apparatus of claim 5, wherein the diagonal matrix (D) is expressed by:

$$\begin{pmatrix} e^{j\theta_1(t)k} & 0 & \cdots & 0 \\ 0 & e^{j\theta_2(t)k} & \cdots & 0 \\ \vdots & \vdots & \ddots & \vdots \\ 0 & 0 & \cdots & e^{j\theta_R(t)k} \end{pmatrix}, \text{ and}$$

satisfies $$\theta_1(t)=0\cdot\theta(t), \theta_2(t)=1\cdot\theta(t)$$
$$\theta_3(t)=2\cdot\theta(t), \theta_4(t)=3\cdot\theta(t)$$

when a spatial multiplexing rate (R) is 4.

* * * * *